United States Patent
Boltz

(10) Patent No.: US 10,124,845 B1
(45) Date of Patent: Nov. 13, 2018

(54) EXTENSIBLE TRAILER

(71) Applicant: Thomas C. Boltz, Monona, WI (US)

(72) Inventor: Thomas C. Boltz, Monona, WI (US)

( * ) Notice: Subject to any disclaimer, the term of this patent is extended or adjusted under 35 U.S.C. 154(b) by 0 days.

(21) Appl. No.: 15/354,111

(22) Filed: Nov. 17, 2016

Related U.S. Application Data

(63) Continuation of application No. 14/569,916, filed on Dec. 15, 2014, now abandoned, which is a continuation of application No. 13/573,245, filed on Sep. 4, 2012, now Pat. No. 8,910,989.

(60) Provisional application No. 61/575,978, filed on Sep. 1, 2011.

(51) Int. Cl.
*B62D 63/06* (2006.01)
*B62D 63/08* (2006.01)
*B62D 33/04* (2006.01)
*B60R 13/06* (2006.01)
*B60P 1/43* (2006.01)
*B60G 3/14* (2006.01)
*B60J 5/10* (2006.01)
*B60J 5/14* (2006.01)
*B60D 1/48* (2006.01)
*B60D 1/06* (2006.01)

(52) U.S. Cl.
CPC ............ *B62D 63/061* (2013.01); *B60D 1/06* (2013.01); *B60D 1/48* (2013.01); *B60G 3/14* (2013.01); *B60J 5/108* (2013.01); *B60J 5/14* (2013.01); *B60P 1/431* (2013.01); *B60R 13/06* (2013.01); *B62D 33/04* (2013.01); *B62D 63/08* (2013.01); *B60Y 2200/40* (2013.01); *B60Y 2410/124* (2013.01)

(58) Field of Classification Search
CPC ...... B62D 63/061; B62D 63/08; B62D 33/04; B60R 13/06; B60P 1/431; B60G 3/14; B60J 5/108; B60J 5/14; B60D 1/48; B60D 1/06; B60Y 2200/40; B60Y 2410/124
See application file for complete search history.

(56) References Cited

U.S. PATENT DOCUMENTS

| | | | |
|---|---|---|---|
| 1,970,967 A | 8/1934 | Maust | 280/401 |
| 2,790,673 A | 4/1957 | Zur Nieden | 296/171 |
| 2,899,237 A | 8/1959 | Nash | 296/26.08 |
| 3,374,010 A | 3/1968 | Crockett et al. | 280/418.1 |
| 3,508,762 A | 4/1970 | Pratt | 280/81.1 |
| 3,778,079 A | 12/1973 | Vornberger et al. | 280/149.2 |
| 3,966,075 A * | 6/1976 | Schultz | B65D 88/005 105/393 |
| 4,114,942 A | 9/1978 | Greiner | 296/172 |
| 4,132,326 A | 1/1979 | Pinto | 414/536 |

(Continued)

*Primary Examiner* — D Glenn Dayoan
*Assistant Examiner* — Melissa A Black
(74) *Attorney, Agent, or Firm* — Jonathan A. Bay

(57) ABSTRACT

An extensible trailer has a rear frame supporting a front cargo deck, and a front frame supporting a front cargo deck. The rear frame has a yoke fixed to it for the front frame to slide in and out of, between collapsed and extended extremes. When collapsing the trailer, the front frame slides into the yoke as the front cargo deck rides up over a front edge of the rear cargo deck, until it lands on top of the rear cargo deck, where it stays all the while the trailer is in the collapsed position. When extending the trailer, the front frame slides out from the yoke as the front cargo deck slides back over the rear cargo deck's front edge, until it lands on top of the front frame, where it stays all the while the trailer is in the extended position.

10 Claims, 15 Drawing Sheets

(56) References Cited

U.S. PATENT DOCUMENTS

| | | | |
|---|---|---|---|
| 4,887,859 A | 12/1989 | Aper | 296/26.08 |
| 4,958,845 A | 9/1990 | Parks | 280/407.1 |
| 5,480,171 A | 1/1996 | Cheffey | 280/149.2 |
| 5,564,725 A | 10/1996 | Brazeal | 280/149.2 |
| 5,639,139 A | 6/1997 | Rush | 280/763.1 |
| 6,138,783 A | 10/2000 | Chene et al. | 180/11 |
| 6,283,554 B1 | 9/2001 | Oherg | 298/85 |
| 6,293,611 B1 | 9/2001 | Schneider et al. | 296/171 |
| 6,461,096 B1 | 10/2002 | Mentele et al. | 414/480 |
| 8,215,692 B2 | 7/2012 | Oriet et al. | 296/26.08 |
| 2001/0008059 A1 | 7/2001 | McManus et al. | 52/67 |
| 2003/0141733 A1 | 7/2003 | Burg | 296/26.09 |
| 2003/0214111 A1 | 11/2003 | Browning | 280/149.2 |
| 2005/0206180 A1 | 9/2005 | Andre et al. | 296/26.08 |
| 2006/0181063 A1 | 8/2006 | Eddings | 280/656 |
| 2011/0140473 A1 | 6/2011 | Gosselin et al. | 296/26.09 |
| 2011/0169290 A1 | 7/2011 | Sheikhha et al. | 296/26.09 |
| 2013/0038043 A1 | 2/2013 | Brown et al. | 280/656 |
| 2013/0241236 A1 | 9/2013 | Vitale et al. | 296/193.01 |

\* cited by examiner

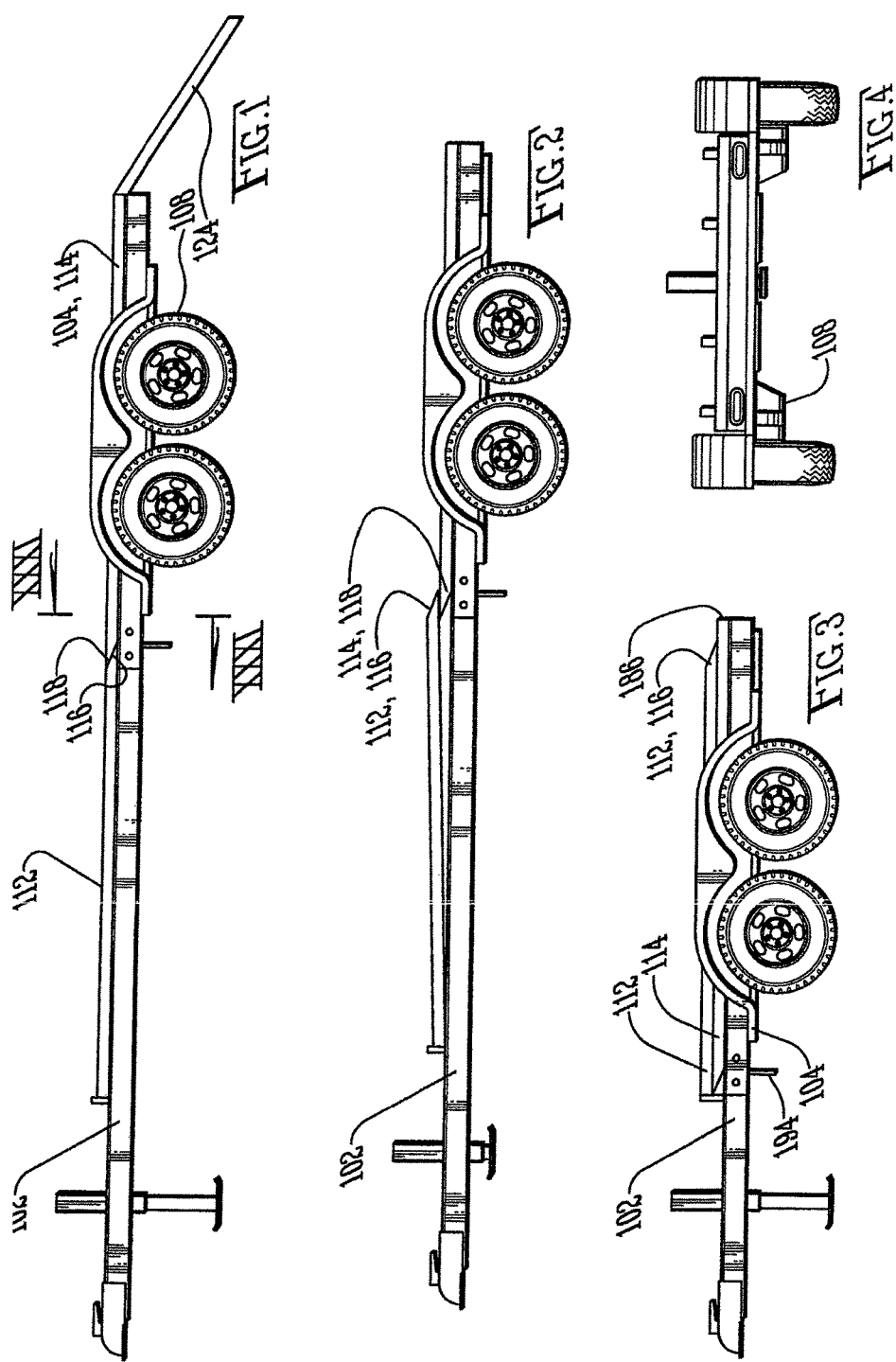

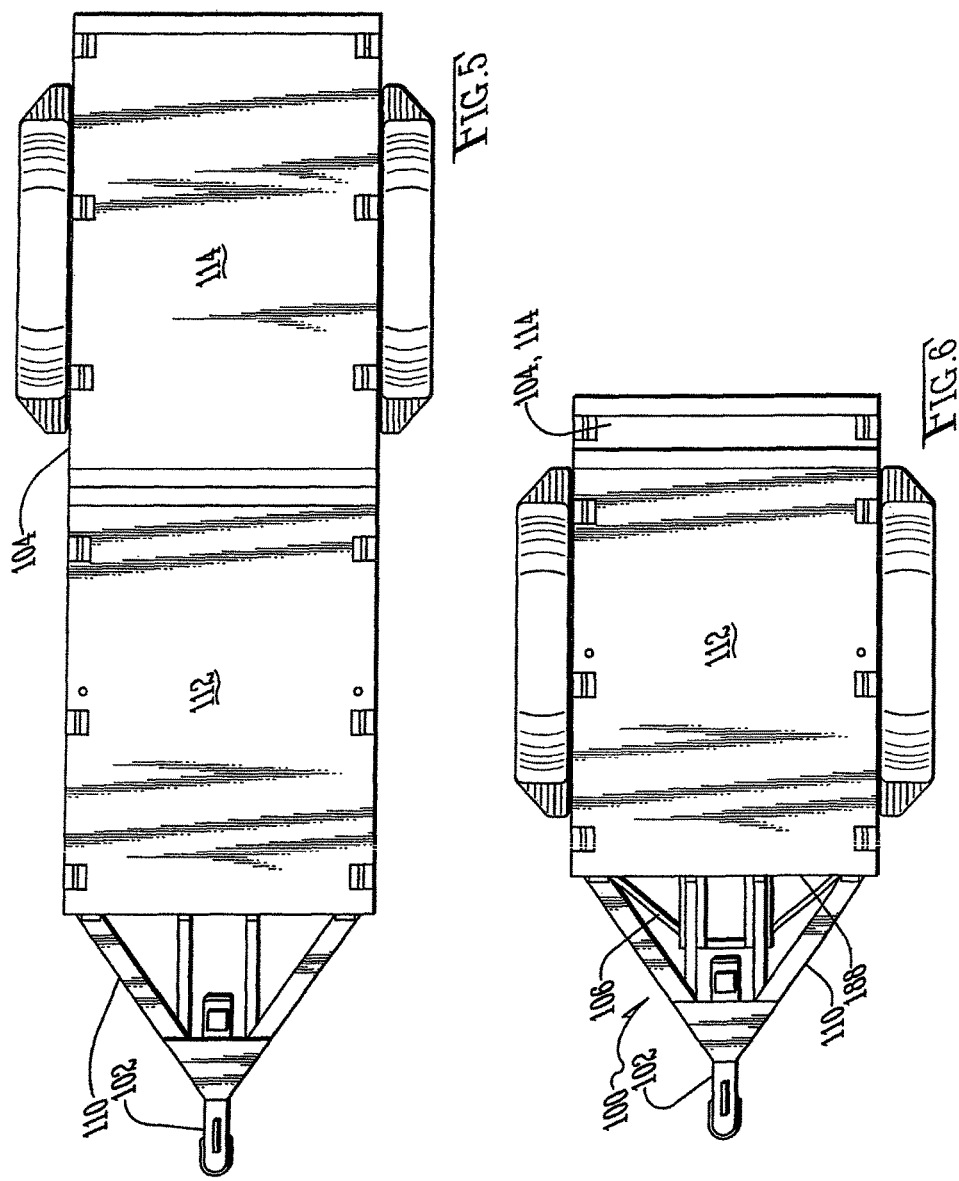

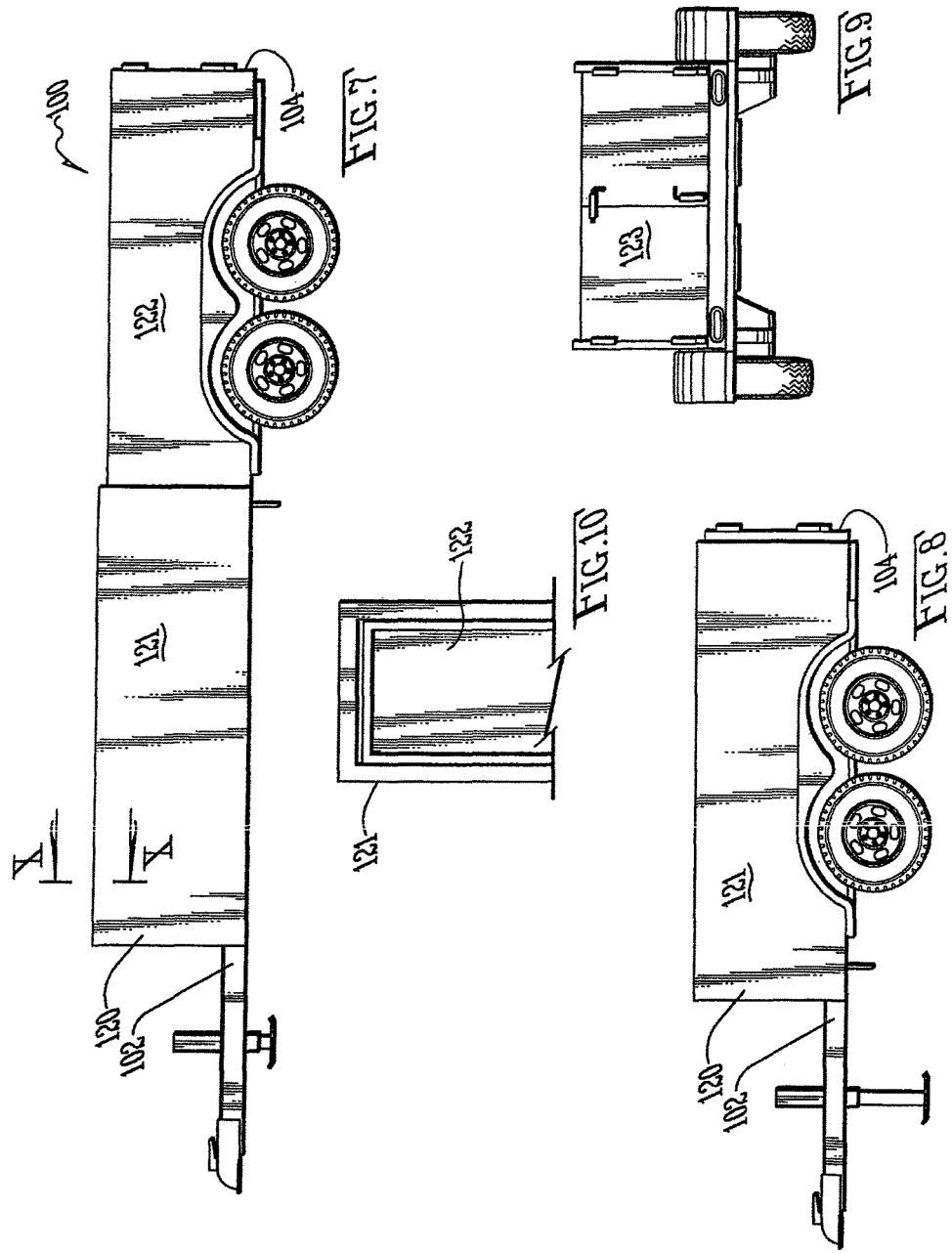

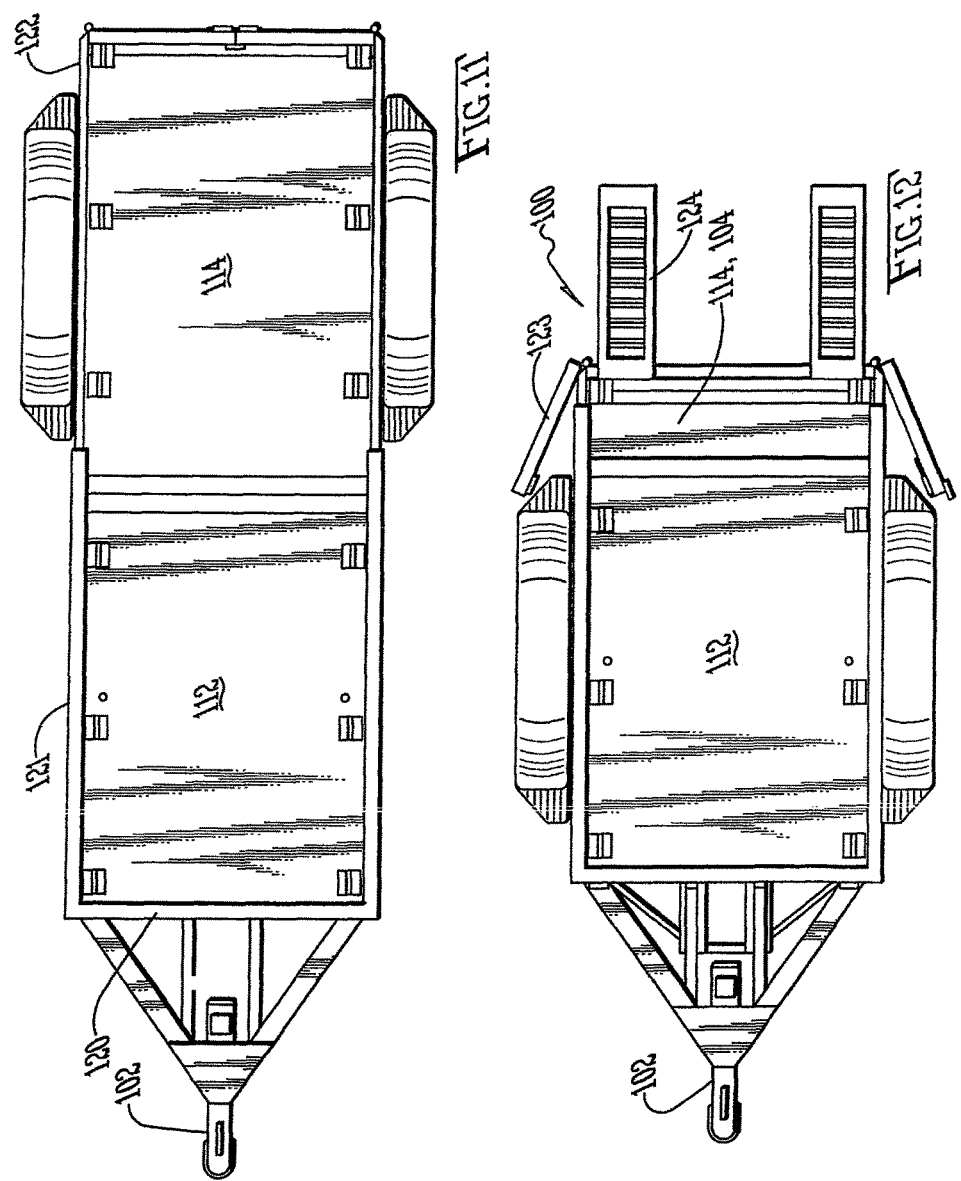

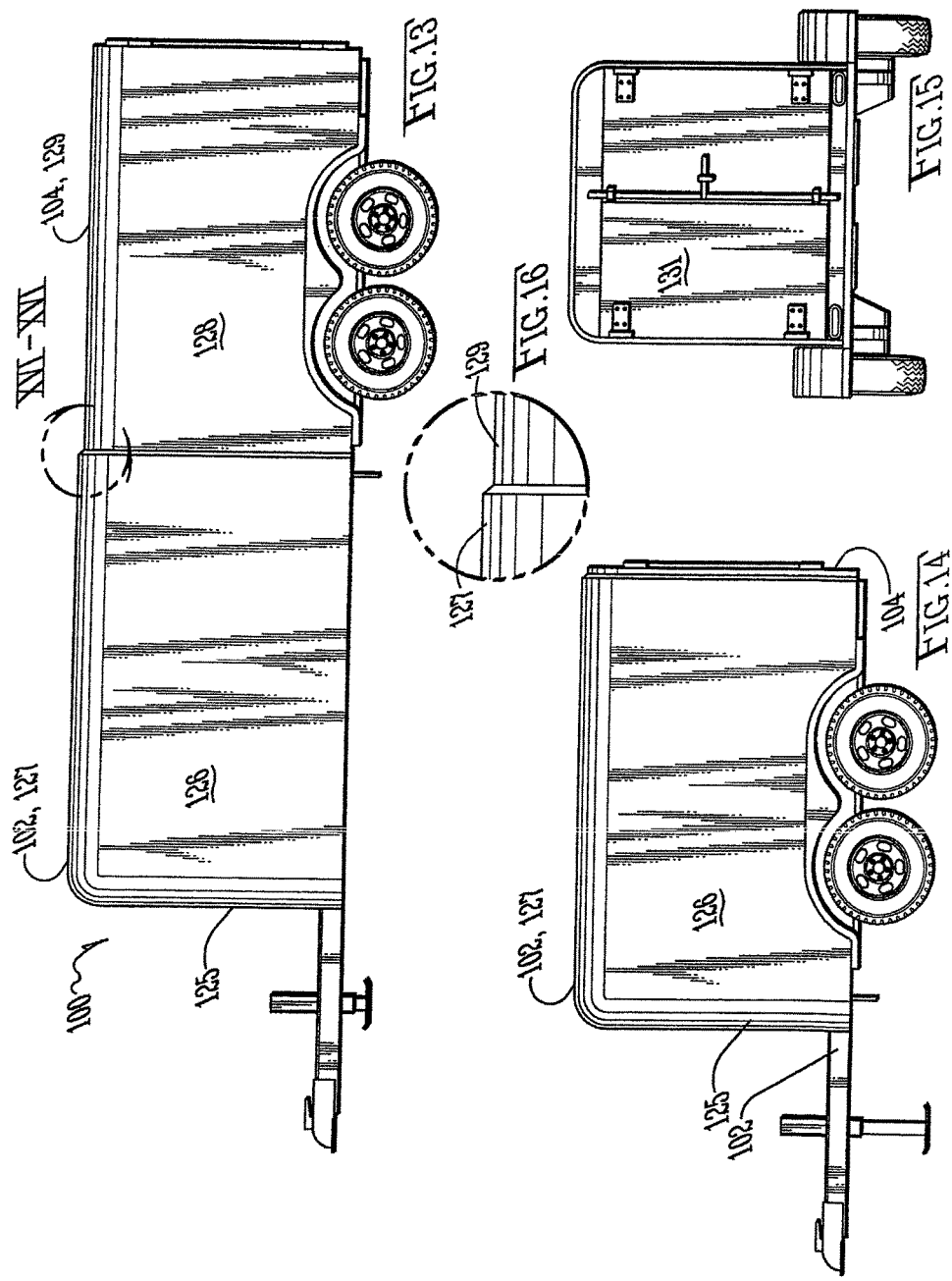

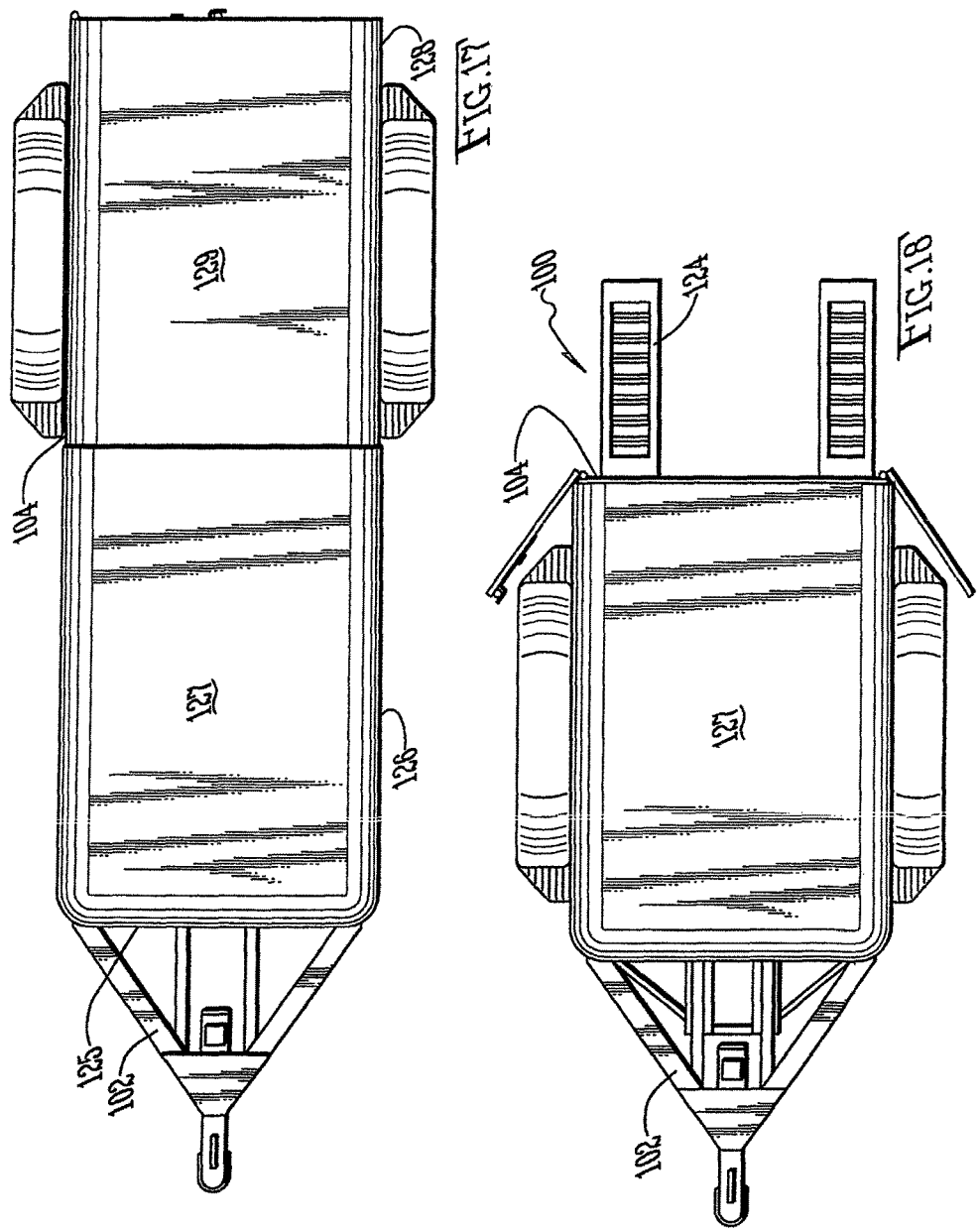

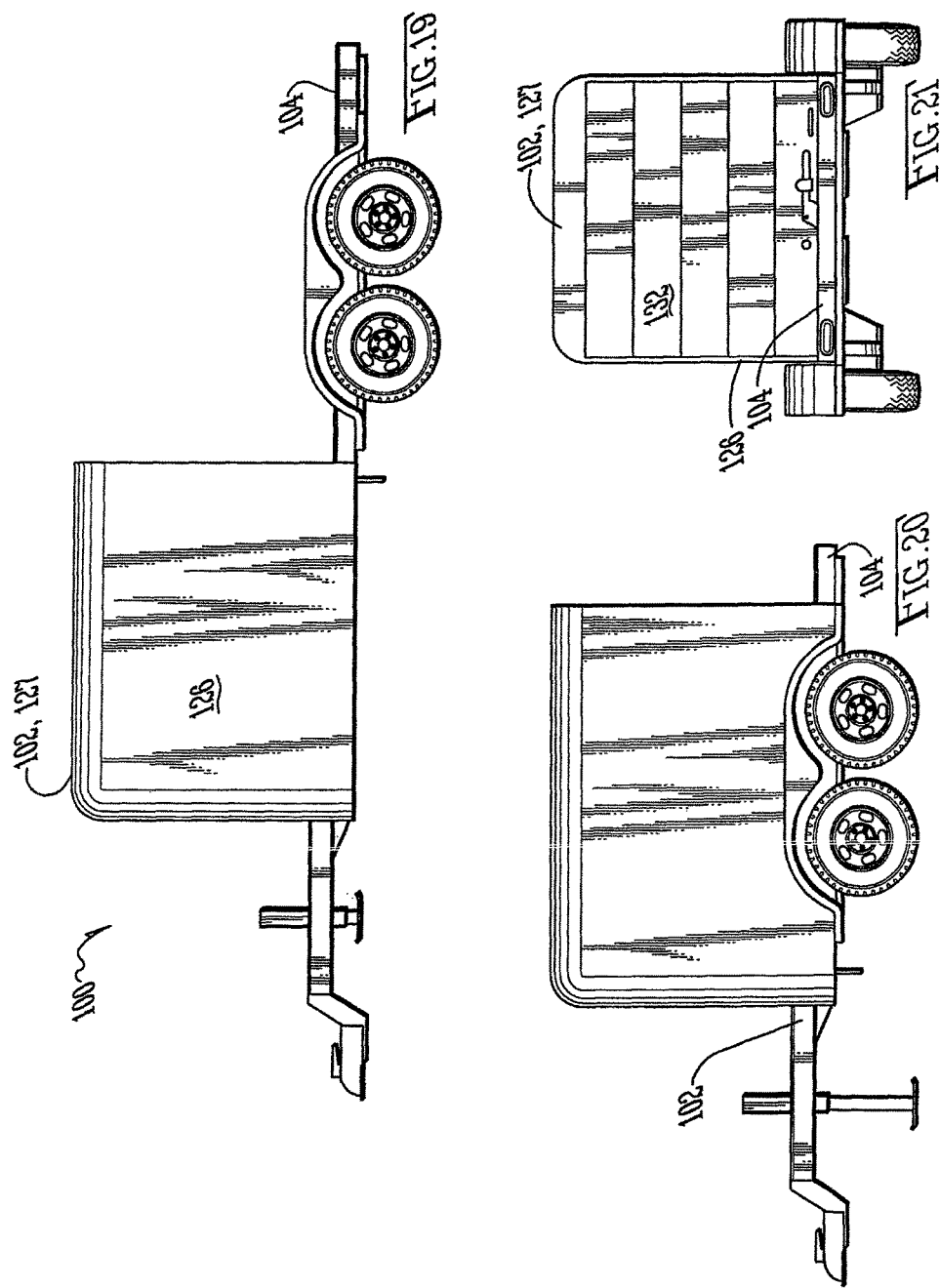

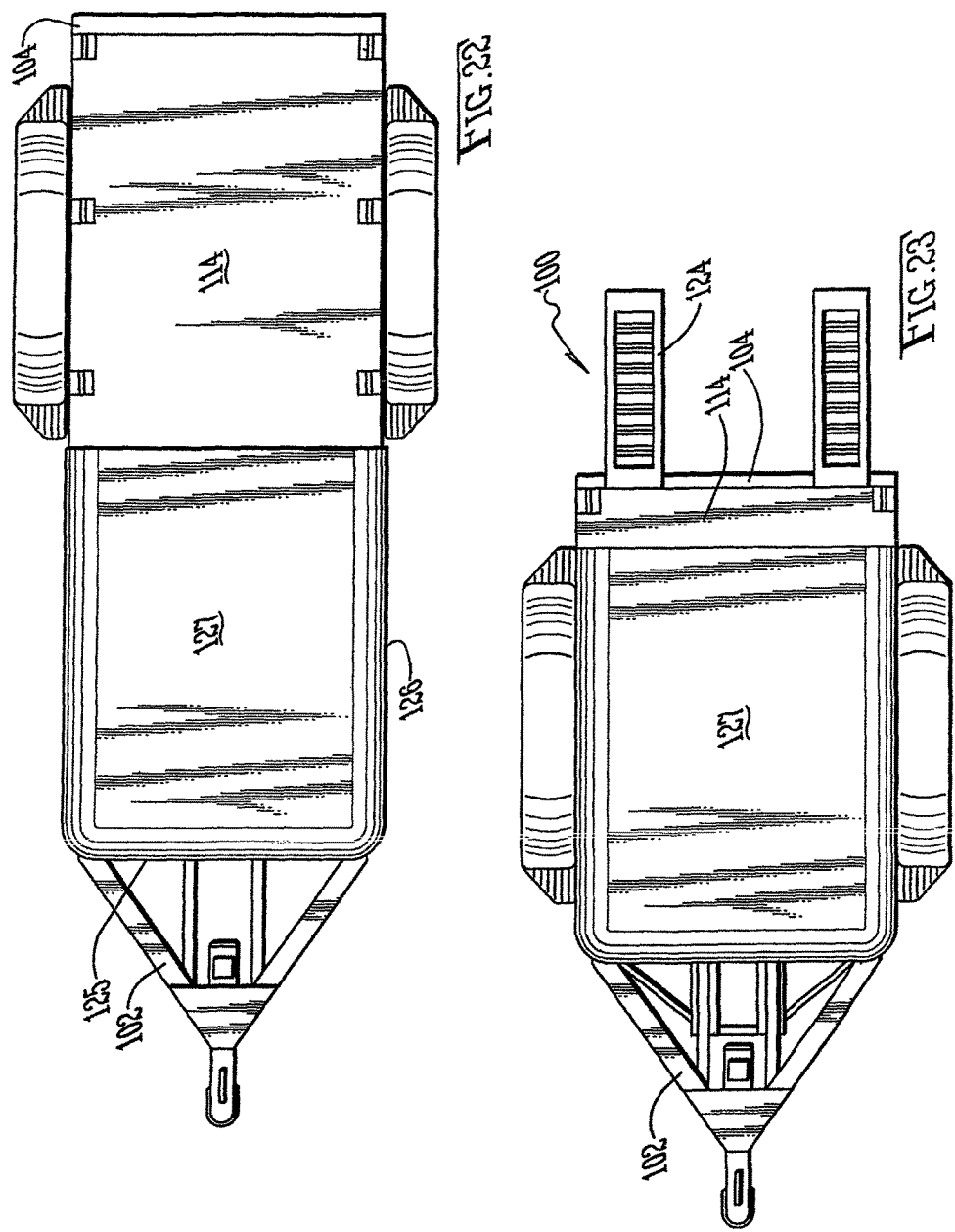

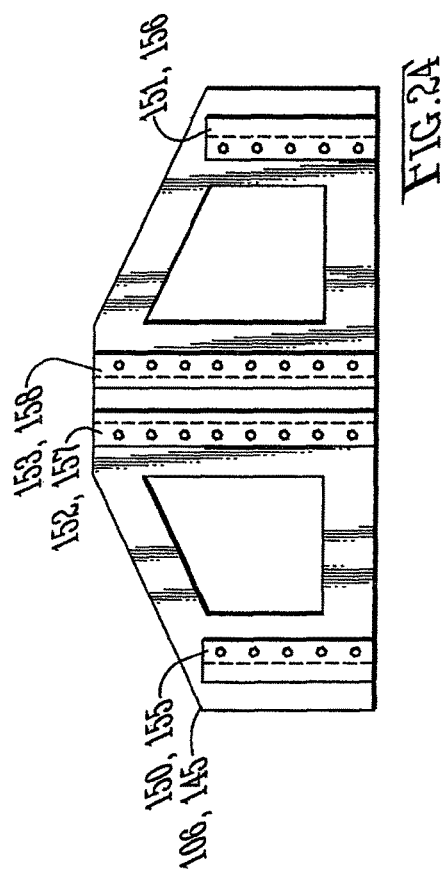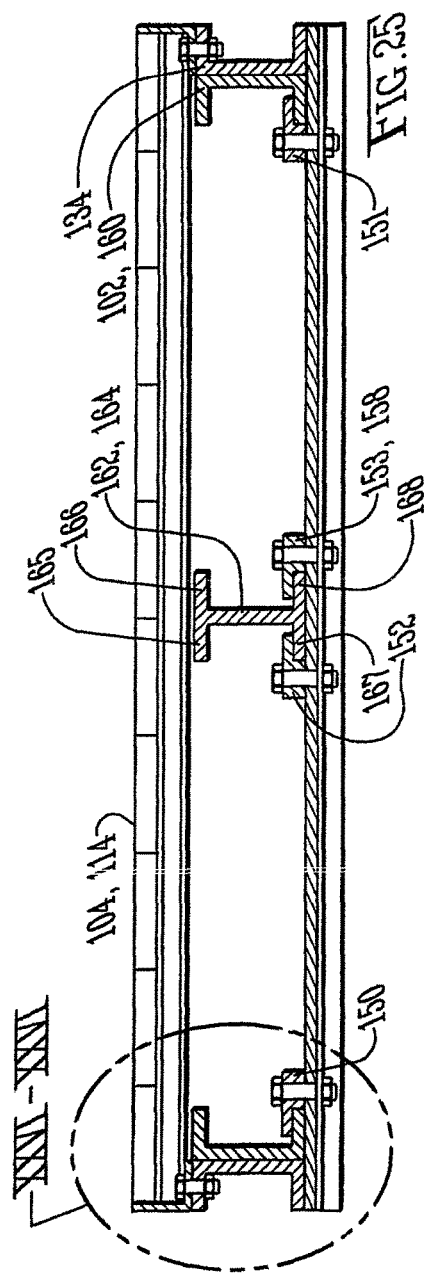

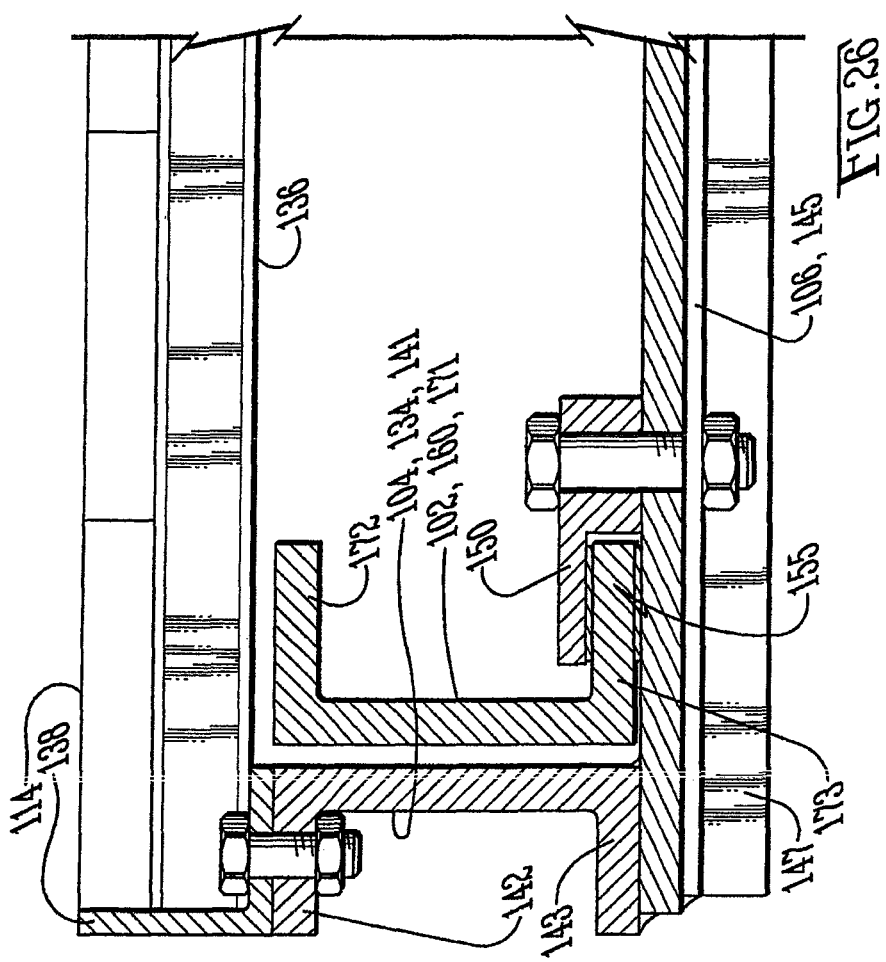

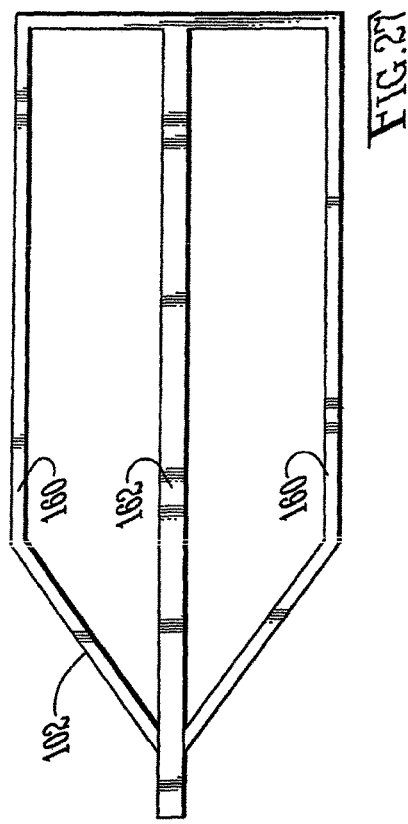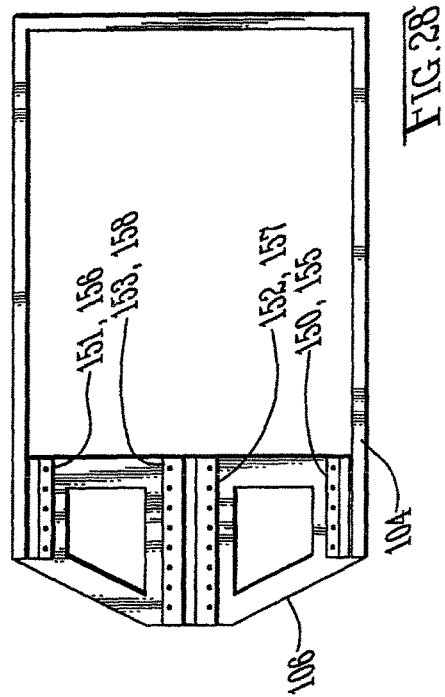
FIG. 27
FIG. 28

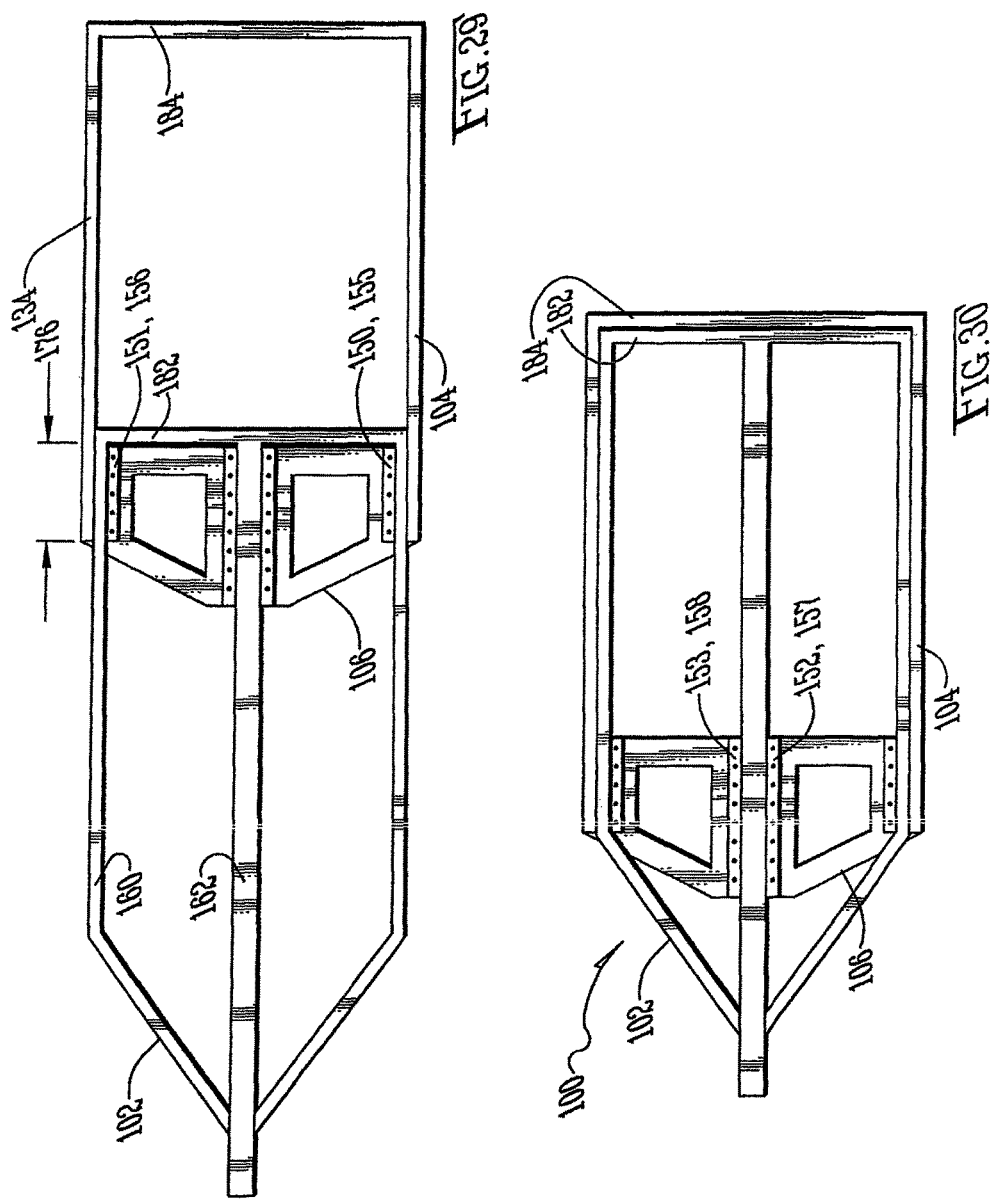

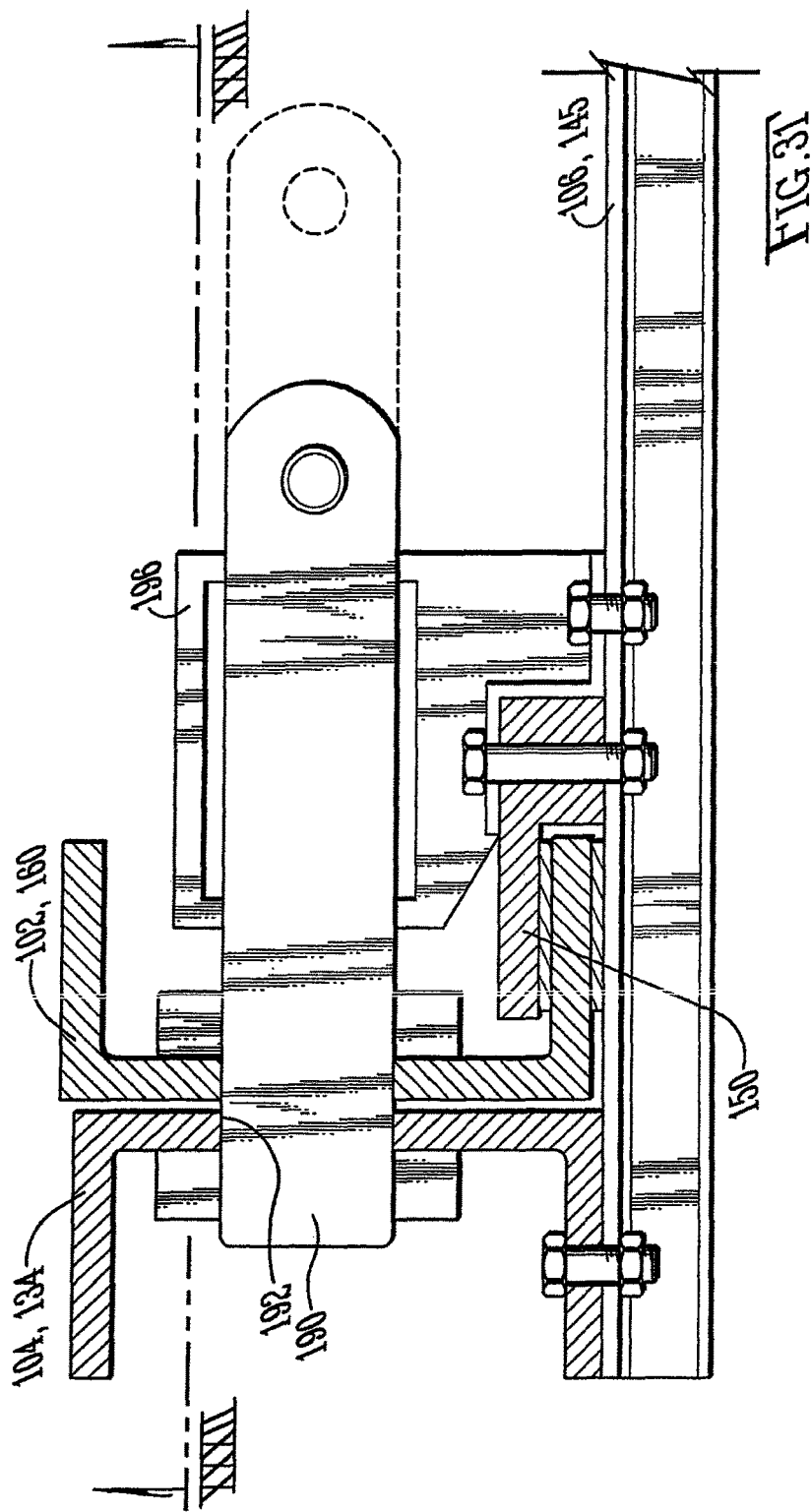

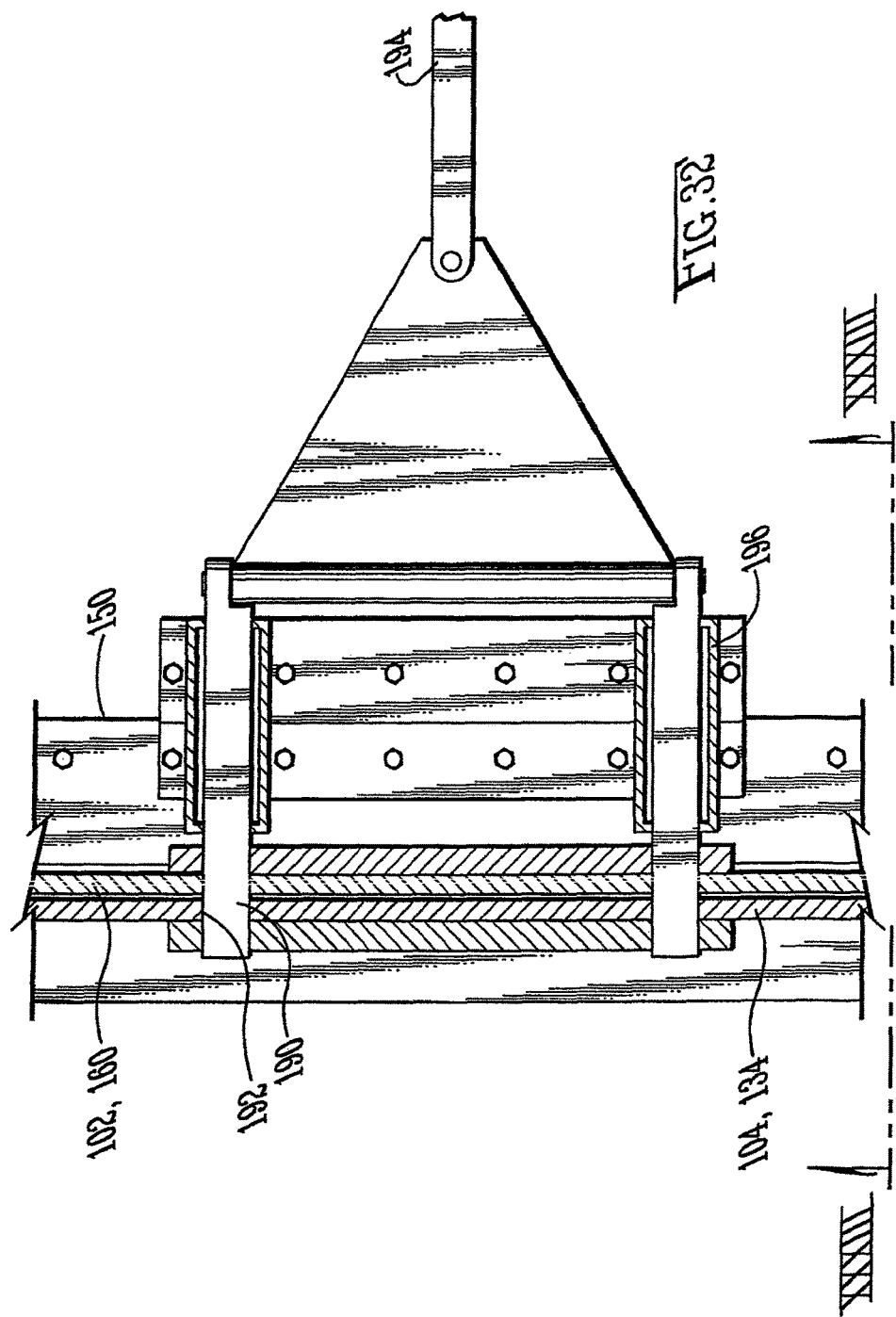

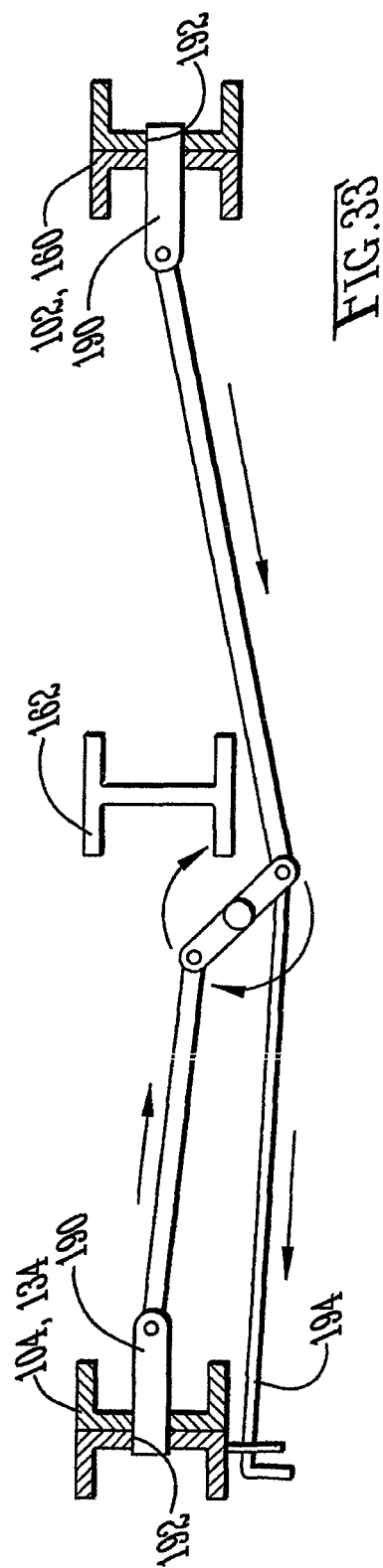

EXTENSIBLE TRAILER

CROSS-REFERENCE TO RELATED APPLICATION(S)

This application is a continuation of U.S. patent application Ser. No. 14/569,916, filed Dec. 15, 2014; which is a continuation of U.S. patent application Ser. No. 13/573,245, filed Sep. 4, 2012, which claims the benefit of U.S. Provisional Application No. 61/575,978, filed Sep. 1, 2011, the disclosures of which are incorporated herein by this reference thereto.

BACKGROUND AND SUMMARY OF THE INVENTION

The invention relates to an extensible trailer.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1 is a side elevational view of an extensible trailer in accordance with the invention, in a fully extended state;

FIG. 2 is a side elevational view comparable to FIG. 1 except showing the extensible trailer in the stages of being collapsed to a fully collapsed state;

FIG. 3 is a side elevational view comparable to FIGS. 1 and 2 except showing the extensible trailer in a fully collapsed state;

FIG. 4 is a rear elevational view thereof;

FIG. 5 is top plan view of FIG. 1;

FIG. 6 is a top plan view of FIG. 3;

FIG. 7 is a side elevational view of an alternate version of the extensible trailer in accordance with the invention, and shown in a fully extended state, wherein this version has sidewalls to make an open-topped cargo box;

FIG. 8 is a side elevational view comparable to FIG. 7 except showing the trailer in the fully collapsed state;

FIG. 9 is a rear elevational view thereof;

FIG. 10 is an enlarged-scale section view taken along line X-X in FIG. 7;

FIG. 11 is a top plan view of FIG. 7;

FIG. 12 is a top plan view of FIG. 8;

FIG. 13 is a side elevational view of a third version of the extensible trailer in accordance with the invention, and shown in the fully extended state, wherein this version comprises sidewalls and a roof to make an enclosed cargo van/camper;

FIG. 14 is a side elevational view comparable to FIG. 13 except showing the trailer in the fully collapsed state;

FIG. 15 is a rear elevational view thereof;

FIG. 16 is an enlarged-scale elevational detail view, as taken where indicated by detail XVI in FIG. 13;

FIG. 17 is a top plan of FIG. 13;

FIG. 18 is a top plan view of FIG. 14;

FIG. 19 is a side elevational view of a hybrid version of the extensible trailer in accordance with the invention, which is a hybrid between the FIG. 1 version and the FIG. 13 version, wherein this version is shown in fully extended state;

FIG. 20 is a side elevational view comparable to FIG. 19 except showing the trailer in the fully collapsed state;

FIG. 21 is a rear elevational view thereof;

FIG. 22 is a top plan view of FIG. 19;

FIG. 23 is a top plan view of FIG. 20, except with the ramps pulled out;

FIG. 24 is a top plan view of a slideway yoke in isolation from the rear frame, for permanent attachment to the rear frame underneath a forward margin thereof;

FIG. 25 is an enlarged-scale rear elevational view of the yoke of FIG. 24, and not in isolation but as attached to the rear frame, along with the front frame being illustrated herein this FIG. 25, which slides back and forth relative the yoke and rear frame, which cooperatively function as a guide for the sliding front frame (wherein the ramps for wheeled vehicles have been removed from view);

FIG. 26 is an enlarged-scale elevational view of detail XXVI in FIG. 25;

FIG. 27 is a bottom plan view of the structural steel framework of the front frame;

FIG. 28 is a bottom plan view of the structural steel framework of the rear frame, and with the yoke attached;

FIG. 29 is a bottom plan view of the front frame framework of FIG. 27 coupled with the combination rear frame framework and yoke of FIG. 28, and wherein the front frame framework is slid to the fully extended position;

FIG. 30 is a bottom plan view comparable to FIG. 27 except showing the front frame framework is slid to the fully collapsed position;

FIG. 31 is an enlarged-scale section view taken along line XXXI-XXXI in FIG. 1;

FIG. 32 is a plan view, partly in section, taken along line XXXII-XXXII in FIG. 31; and FIG. 33 is a reduced-scale elevational view, taken in the direction of arrows XXXIII-XXXIII in FIG. 32.

DETAILED DESCRIPTION OF THE PREFERRED EMBODIMENTS

FIGS. 1 through 29 show an extensible trailer 100 in accordance with the invention. The trailer 100 can be scaled for a light duty, a heavy duty and/or a military duty rating. The trailer 100 can extend or collapse in length enabling the hauler to carry different size loads with the same trailer 100.

The extensible and collapsible trailer 100 can be constructed to any length or width and can be equipped with single or tandem wheels depending on desired rating for load capacity. Preferably the trailer 100 is equipped with electric and manual brakes.

The extensible trailer 100 in accordance with the invention can be built in alternative versions including without limitation a flatbed trailer (FIGS. 1 through 6), a cargo box (FIGS. 7 through 12), and/or an enclosed trailer (eg., cargo van and/or camper) (and FIGS. 13 through 18). FIGS. 19 through 23 show a hybrid version between a flatbed trailer and enclosed van and/or camper.

It is an aspect of the invention that all versions of the inventive trailer 100 can be scaled in size and capacity such that they can be towed by vehicles ranging from motorcycles, automobiles, trucks, semi tractors or up to the heaviest military and/or mining vehicles.

Motorcycles can be provisioned with a version of the trailer 100 in accordance with the invention that is a telescoping camper, as shown by the FIGS. 13 through 18 version. Preferably motorcyclists tow the FIGS. 13 through 18 version of the trailer 100 until he or she arrives at his or her destination. The FIGS. 13 through 18 version of the trailer 100 quickly and easily extends to full extension to make a comfortable sleeping camper. The extended camper might include pop-up provisions to further increase headspace and/or interior volume. Preferably a luggage rack is provided for further luggage hauling capacity.

It is a further aspect of the invention that these trailers allow the hauling of different size loads with the same trailer. Indeed, semi tractors will be able to haul many different sizes of shipping containers with the use of one single extensible trailer 100, without the current need of having multiple trailers on site.

It is yet another aspect of the invention that these inventive trailer 100 takes less room to store when collapsed.

FIGS. 1 through 6 show a flatbed version of the trailer 100 in accordance with the invention. The trailer 100 comprises a front frame 102, a rear frame 104, and a slideway yoke 106 attached fixed underneath a forward margin of the rear frame 104 of the trailer 100, and in which the front frame 102 translates back and forth between the extremes of the fully extended and fully collapsed states. The rear frame 104 is mounted on top of riding gear 108 comprising tires, wheels, brakes and preferably an air ride suspension system. Preferably the brakes include a manually-operated parking brake. Preferably the parking brake can be set and released by a manual operator on the trailer 100. That way, the parking brake can be set while the trailer 100 is being collapsed or extended. The riding gear 108 can include a single tire on each side, tandem tires on each side, or more. The front frame 102 has a front end 110 which tapers into a tongue and then ultimately a hitch for coupling to a tow vehicle (not shown). Both frames 102 and 104 have cargo decks 112 and 114 respectively. Preferably the cargo decks 112 and 114 are decked with hardwood that can be easily replaced. Preferably also, the trailers 100 are equipped with sturdy, plate steel, wheel fenders.

FIG. 1 shows the trailer 100 in the fully extended state, FIG. 2 in midst of the process of either being collapsed or extended, and FIG. 3 shows the trailer 100 in the fully collapsed state.

FIG. 2 shows that the cargo deck 112 of the front frame 102, while the trailer 100 is in the process of being collapsed, rides up over the cargo deck 114 of the rear frame 104. In reverse, the front cargo deck 112 pulls out over the rear cargo deck 114. When fully extended, the cargo decks 112 and 114 meet at respective edges 116 and 118 that have been cooperatively beveled, which allows the two cargo decks 112 and 114 to lock together and present a flat surface for cargo. FIG. 3 shows that the beveled edge 116 of the front cargo deck 112 also allows an easy edge for a vehicle to drive over, up from the plane of the rear cargo deck 114 and onto the plane of raised, front cargo deck 112.

The inventive independent suspension 108 shown by FIG. 4 (eg., a rear elevational view) provides greater clearance and a smoother ride than conventional axle type suspensions. That is, each set of left and right tires of the tandem trailer 100 tires lack a transverse axle. Each of the four tires is suspended by a trailing rocker beam pivoted to the underside of the rear frame 104. The trailing end of the rocker beam sandwiches a heavy spring and shock absorber system between itself and the rear frame 104. The lack of an axles provide better clearance when the trailer 100 is towed over rough terrain.

FIGS. 5 and 6 shows better that there are eight (8) tie down bars available when the trailer 100 is collapsed and twelve (12) tie down bars available when the trailer 100 is extended. FIGS. 5 and 6 also show that the trailer 100 preferably has a single landing gear located on the centerline of the trailer 100 right behind the tongue.

FIGS. 7 through 12 show a cargo box version of the trailer 100 in accordance with the invention. The front frame 102 has a front wall 120 and spaced apart left and right sidewalls 121 extending between forward and trailing edges. The forward edges of the front frame 102's left and right sidewalls 121 meet at the front wall 120 thereof. The rear frame 104 likewise has spaced apart left and right sidewalls 122 which extend between forward and trailing edges. The trailing edges of the rear frame 104's sidewalls bracket a closure such as a tail gate or swing gate 123 and the like.

Preferably the rear frame 104's sidewalls 122 are relative thin panels. Conversely, preferably the front frame 102's sidewalls 121 are hollow in the form of elongated, inverted-U shaped channels, as shown by FIG. 10. The elongated, inverted-U shaped channels walls 121 of the front frame 102's sidewalls 121 are sized and proportioned such that the relatively thinner panel-form sidewalls 122 of the rear frame 104 can telescope therein. Hence the sidewalls 122 of the rear frame 104 telescope into the sidewalls 121 of the front frame 102, enabling the trailer 100 to be collapsed and extended between the extremes of the fully collapsed state and the fully extended state. Preferably the walls 121,122 and cargo decks 112,114 are sealed by the use of elastomeric seals to provide a form of a moisture and/or debris barrier.

FIGS. 11 and 12 shows better that the trailing edges of the sidewalls 122 of the rear frame 104 are equipped with swing doors 123 that close to prevent cargo from sliding out. Preferably, these doors 123 swing fully open and are readily secured for easy access. FIG. 12 shows better than what was already shown in FIG. 1; namely, that the rear frame 104 is equipped with self-contained slide-out, slide-in ramps 124 for loading and off-loading wheeled vehicles. It is an aspect of the invention that the ramps 124 can be adjusted to variable width for different cargo wheel bases. The ramps 124 are securely carried under the rear frame 104 of the trailer 100 when not in use.

FIGS. 13 through 18 show an enclosed van and/or camper version of the trailer 100 in accordance with the invention. The front frame 102 not only has a front wall 125 and sidewalls 126, it also has a roof 127. Correspondingly, the rear frame 104 not only has sidewalls 128, but it too has a roof 129. Comparable to how the sidewalls 122 of the rear frame 104 for the FIGS. 7-12 version of the trailer 100 telescoped into the sidewalls 121 of the front frame 102 thereof, here too the sidewalls 128 and roof 129 of the rear frame 104 of this FIGS. 13-18 version telescope into the sidewalls 126 and roof 127 of the front frame 102 hereof. This version also has swing doors 131 at the trailing end of the trailer 100, but these swing doors 131 entirely shut the enclosed van and/or camper compartment such that it is a self-contained interior spaces. Elastomeric seals would again provide a form of moisture and/or debris barrier.

FIGS. 17 and 18 show better that the front frame 102's sidewalls 126 meet the front wall 125 thereof in contoured corners for less drag, better aerodynamic slip. FIGS. 13 and 14 show that the same is true for the corner where the roof 127 and front wall 125 of the front frame 102 meet.

FIGS. 19 through 23 show a hybrid version of the trailer 100 in accordance with the invention, comprising in part the rear frame 104 of the FIG. 1 flatbed version and, in other part, the front frame 102 of the FIG. 13 enclosed van and/or camper version. As FIG. 21 shows better, the front frame 102's sidewalls 126 and roof 127 form a common trailing edge for the enclosed van and/of camper portion of the front frame 102. This is preferably covered by a closure 132 which can be readily opened and closed. It is an option that this version of the trailer 100 is equipped with a roll up type door 132 for the closure of the enclosed van and/of camper portion of the front frame 102. Thus while the trailer 100 is in the fully extended state, the front frame 102 offers climate and security features, while the rear frame 104 serves the same utility as a flatbed trailer 100. Preferably the door 132 can be securely latched when closed, and can be pad-locked for security. Again, preferably this compartment formed by the front frame 102 is provided with elastomeric seals that function as moisture and/or debris barriers.

FIG. 24 is a top plan view of a yoke 106 for coupling the front and rear frames 102 and 104 together. The yoke 106 is permanently attached underneath a forward margin of the rear frame 104 of the trailer 100 such that the yoke 106 and rear frame 104 combined together function as a unit to form guide-way for the sliding front frame 102.

FIGS. 27 and 28 show the front frame 102 de-coupled from the rear frame/yoke combination 104/106. FIG. 29 as well as FIG. 30 shows the front frame 102 coupled to the rear frame/yoke combination 104/106.

With reference to FIG. 6, portions of this yoke 106 can be seen underneath the plane of the front end 110 of the front frame 102 (ie., which tapers into the tongue and then ultimately the hitch). FIG. 6 is a plan view of a fully collapsed state for the trailer 100, which also corresponds to FIG. 30.

In comparison, FIG. 5 shows that this yoke 106 has been slid rearwardly out of view, such that in this view it would be situated underneath the rear margin of the front frame 102 (but again, it is hidden in this view). Hence FIG. 5 is a plan view of a fully extended state for the trailer 100, and this corresponds to FIG. 29. In any event, the front frame 102 slides (or translates) back and forth between the extremes of the fully extended and fully collapsed states relative to the rear frame 104 by sliding through provisions provided by the yoke 106, as more particularly described next.

FIG. 25 is an enlarged-scale rear elevational view of FIG. 6 (with the slide-in, slide-out ramps removed from view). FIG. 25 shows the front frame 102 being held for guided sliding by the rear frame/yoke combination 104/106. The matters illustrated by FIG. 25 are representative of all the versions of the trailer 100 in accordance with the invention.

Preferably the rear frame 104 and yoke 106 are fabricated from structural steel such that they can be welded and/or fastened in a strong assembly (except for, that is, the preference for the rear frame 104's cargo deck 114 of hardwood). In a plan view, the yoke 106 itself has sort of a delta-wing shape (ie., FIG. 24). But in an end-on elevational view (ie., FIG. 25), the rear frame 104 and yoke 106 are fabricated and joined together to form a flattened, rectangular tube shape. Additionally, this is tube which is open at both ends.

FIGS. 25 and 26 show that the rear frame 104 comprises a spaced apart pair of left and right outboard girders 134. Preferably these outboard girders 134 have the form of a C-shaped channel that opens to the outboard direction relative the rear frame 104's longitudinal central axis. The rear frame 104 includes a series of transverse deck supports 136 that run across the top of these outboard girders 134. These transverse deck supports 136 are produced from and without limitation structural steel beams such as C-shaped channels and/or I-beams. The deck supports 136 have left and right outer ends that are cupped by structural steel ells 138 which extend longitudinally between the forward and trailing ends of the rear frame 104. The transverse deck supports 136 support the longitudinal planks of the hardwood cargo deck 114. The C-shaped channels of the girders 134 have a vertical web 141 extending between an upper horizontal flange 142 and a lower horizontal flange 143. The longitudinally-extending, left and right outboard ells 138 of the rear frame 104 sit on top of the upper flanges 142 of its respective left and right girders 134. Preferably the ells 138 are bolted to the girders 134 (as shown better in FIG. 26).

Staying in FIG. 26, the yoke 106 comprises a single panel 145 of plate steel plate with a pair of openings shown better in FIG. 24 to reduce weight. The panel 145 spans between and rests underneath the lower flanges 143 of the rear frame 104's outboard girders 134. The panel 145 is preferably welded to the rear frame 104's outboard girders 134. Preferably the panel 145 is stiffened against flexure by structural steel cross-members 147, which can be ell beams or perhaps T-beams and the like. The cross-members 147 are preferably welded to the panel 145.

Hence, as FIG. 25 shows better, the rear frame 104 and yoke 106 are joined together to form a flattened, rectangular tube shape. The rear frame 104's spaced apart outboard girders 134 form the spaced apart vertical sidewalls. The rear frame 104's cargo deck 114 and transverse supports 136 form the top wall. And the yoke 106, which is primarily the panel 145 that is stiffened by the transverse cross-members 147, forms the bottom wall.

Staying in FIG. 25, the yoke 106 includes four tracks 150-53 that form four longitudinally extending slideways 155-58. Each slideway 155-58 takes the form of a C-shaped groove. The C-shaped grooves that are the two outboard slideways 155 and 156 open to the outboard direction relative the yoke 106's central longitudinal axis. The C-shaped grooves that are the two inner slideways 157 and 158 open to the inboard direction relative the yoke 106's central longitudinal axis.

The C-shaped cross-sections of the slideways 155-58 are defined by a horizontal bottom wall, a vertical sidewall, and horizontal top wall. The horizontal bottom wall is defined by the panel 145 of the yoke 106 or, more particularly, the panel 145's top surface. The sidewalls and top walls of the C-shaped slideways 155-58 are defined by the tracks 150-53.

Preferably these tracks 150-53 are produced from heavy, structural steel bars. That is, the tracks 150-53 are preferably elongated and are attached to the panel 145 to extend along longitudinal axes. Each track 150-53 is preferably produced from a bar that has a rectangular cross-section in which the horizontal measure is about four (4) times as wide as the vertical measure (ie., the height). Each bar has one-fourth (¼-th) of its material notched out of one bottom corner thereof. The notch is likewise rectangular. The notch recesses inward into the rectangular bar to the vertical mid-line thereof, and upward into the rectangular bar to the horizontal mid-line.

When done, each track 150-53 has a cross-sectional shape which can be likened to a thick, block-P. That is, in the technical field of typography, the letter "P" is said to have a vertical stem and then a "bowl." In other words, typography calls the curved part of a letter that encloses a circle by this name:—ie., a "bowl." Here, the tracks 150-53 have a thick, block-P shape except that the bowl portion is filled in with solid material.

The tracks 150-53 are fastened to the panel 145 of the yoke 106 rather than welded in order to ensure trueness and avoid warping that can be introduced by welding. FIG. 24 shows that the tracks 150-53 are thoroughly fastened to the panel 145 by rows of closely-spaced fasteners. The tracks 150-53 are fastened to the panel 145 by their bowl portions, with their stem portions cantilevered to overhang parallel above the panel 145 to complete the C-shaped-slideway 155-58.

To turn to the front frame 102, FIG. 25 shows that the front frame 102 is represented by three longitudinally-extending beams 160 and 162 of structural steel, namely, a pair of outboard C-shaped channels 160 and a laterally centered I-beam 162 extending along the common longitudinal central plane of symmetry for the yoke 106 and front and rear frames 102 and 104. The outboard C-shaped channels 160 of the front frame 102 open inboard towards each other and relative to this common longitudinal central plane of symmetry. The I-beam 162 has a vertical web 164 contained in the common longitudinal central plane of symmetry.

The I-beam 162 also has a pair of left and right upper flanges 165 and 166, and a pair of left and right lower flanges 167 and 168. The vertical web 164 and the left and right upper flanges 165 and 166 of the I-beam 162 float free from touching any structure in the flattened rectangular tube formed by the rear frame 104 and the yoke 106. In contrast, the left and right lower flanges 167 and 168 of the I-beam 162 are constrained inside the C-shaped slideways 157 and 158 of the inner pair of tracks 152 and 153.

FIG. 26 shows better that each C-shaped, outboard channel 160 of the front frame 102 has a vertical web 171 extending between an upper and lower flange 172 and 173. The vertical web 171 and upper flange 172 of the front frame 102's outboard channels 160 float free from touching any structure in the flattened rectangular tube formed by the rear frame 104 and the yoke 106. In contrast, the lower flange 173 of the outboard channels 160 of the front frame 102 are constrained inside the C-shaped slideways 150 and 151 of the outboard pair of tracks 155 and 156. FIG. 26 shows better than FIG. 25 that the slideways 155-58 are provided with friction-reducing provisions. This could take any form of a lubricant or graphite and so on. Among other choices, it is preferred to line the slideways 155-58 with polytetrafluoroethylene (PTFE) or the like.

Contrasting between FIGS. 29 and 30 shows that the front frame 102 slides longitudinally fore and aft relative the rear frame/yoke combination 104/106. Returning to FIG. 25, the front frame 102 is permitted sliding movement by virtue of the lower flanges 167 and 168 of its central I-beam 162 as well as the lower flanges 173 of its two outboard channels 160 in the four (4) respective C-shaped slideways 155-58 formed by the yoke 106. Nothing but the lower flanges 167-68 and 173 of the front frame 102 makes rubbing contact with any other part of the flattened rectangular tube formed by the rear frame/yoke combination 104/106. Lateral mis-alignment (eg., binding) is avoided by having two of the C-shaped slideways 155 and 158 open to the left and two to the right (ie., slideways 157 and 156).

More particularly, the two outboard slideways 155 and 156 open to the outboard direction relative the common longitudinal central plane of symmetry. The two inboard slideways 157 and 158 open to the inboard direction relative to the common longitudinal central plane of symmetry.

To revisit what was described above, when the trailer 100 is in the process of being collapsed, the cargo deck 112 of the front frame 102 rides up over the cargo deck 114 of the rear frame 104. The front cargo deck 112 does not enter the flattened rectangular tube formed by the rear frame/yoke combination 104/106. In reverse, when the front frame 102 is being pulled out into the extended stated, the front cargo deck 112 is pulled along with the front frame 102, sliding over the rear cargo deck 114 until the front cargo deck 112 lands on the upper flanges 165-66 and 172, respectively, of the central I-beam 162 and the left and right outboard channels 160 of the front frame 102.

FIG. 29 illustrates the following. When the trailer 100 is in the fully extended state, the slideways 155-58 of the yoke 106 require some longitudinal length to grip on the tail ends of the front frame 102's central I-beam 162 and left and right outboard channels 160. That is, the front frame 102 cannot be pulled out completely of the slideways 155-58 of the yoke 106, or the two frames 102 and 104 would separate, like train cars being disconnected from each other.

The yoke 106's tracks 150-53 do not all have the same grip length among each other. The grip lengths of the two outboard tracks 150 and 151 are shorter than the grip lengths of the two inboard tracks 152 and 153. In FIG. 29, reference numeral 176 indicates a lateral slice across the front and rear frames 102 and 104 that corresponds to the grip length (eg., 176) of the two outboard tracks 150 and 151.

When the two frames 102 and 104 are in the fully extended position (ie., FIG. 29), this lateral slice 176 can be given to either the rear cargo deck 114, the front cargo deck 112, or a split between the two. It is a preference of the invention to cover the slice indicated in FIG. 29 with the rear cargo deck 114. Hence FIG. 1 shows that the front cargo deck 112 ends where the rear frame 104 begins. But as FIG. 29 shows, the front frame 102 extends a bit further into the rear frame 104 than where the trailing edge 116 of the front cargo deck 112 would line up if it were illustrated in FIG. 29 (it is not).

This can be partially reckoned by comparing FIGS. 3 and 30. The trailer 100 is shown in the fully collapsed state in both views. FIG. 30 shows that the front frame 102's tail end 182 abuts up flush against the rear frame 104's tail end 184. However, FIG. 3 shows that the front cargo deck 112's trailing edge 116 is well short of the rear cargo deck 114's trailing edge 186. The gap between the length of the rear cargo deck 114 and the relatively shorter front cargo deck 112 corresponds to the grip length 176 of the yoke 106's outboard pair of two tracks 150 and 151.

As FIG. 24 shows better, the yoke 106 has a plan form of a delta-wing shape. That way, the inboard pair of tracks 152 and 153 are longer than the outboard pair of tracks 150 and 151. FIG. 6 shows better one advantage of this. FIG. 6 is a top view of the trailer 100 in the collapsed state. The forward reaches of the delta-wing shaped yoke 106 can be discerned underneath the framework that makes up the tapering front end 110 of the front frame 102. The front frame 102's central I-beam 162 has a front end that extends further forward of the front ends of the outboard C-shaped channels 160. Correspondingly, the yoke 106's inboard pair of slideways 157 and 158 have front ends that project further forward than the front ends of the outboard pair of channels 160. In the fully collapsed state, the tapered front end 110 of the front frame 102 gives the tapered front end of the yoke 106 clearance to travel past the front edge 188 of the front frame 102's cargo deck 112, without being blocked by anything.

Hence the yoke 106's delta wing shape gives the inboard pair of tracks 152 and 153 the advantage of a longer grip length than geometry allows the outboard pair of tracks 150 and 153.

In the fully extended state, the greater length of the yoke 106's inboard tracks 152 and 153 gives these two tracks 152 and 153 a greater grip length on the central I-beam 162, and a grip length which spans the seam between the meeting edges 116 and 118 of the front and rear cargo decks 112 and 114.

FIGS. 31 and 32 shows aspects of frame-release locking pin components (190,192,194,196) in accordance with the invention for locking together and/or releasing apart the front and rear frames 102 and 104. The frame-release locking pins 190 are biased to insert into (and stay inserted into) aligned holes 192 therefor in the outboard C-shaped channels 160 and 134, respectively, of both the front and rear frames 102 and 104. While inserted through the aligned holes 192 of the both the front and rear frames 102 and 104, no mutual sliding therebetween is possible. The frame-release locking pins 190 are withdrawn from the holes 192 by a manual operator 194 better shown in FIG. 33.

The locking pins 190 are mounted in a fixture 196 that is attached (eg., bolted) to the panel 145 of the yoke 106. FIG. 32 shows better that each side of the trailer 100 is locked and/or unlocked with dual frame-release pins 190. FIG. 33 shows that a single actuator 194 simultaneously operates all four pins 190 (ie., the two each side).

In use, preferably after the trailer 100 is hitched to a tow vehicle (not shown), and then the following procedure is used to extend, and after that collapse, the trailer.

Extending the Trailer
1) Set a trailer brake on the trailer's tires to secure the rear frame stationary.
2) Disconnect light cord on side of trailer.
3) Remove pins for the front cargo deck on forward end.
4) Pull frame pin release arm on side of trailer and secure in the unlocked position.
5) Use tow vehicle to pull front frame forward, pulling it past its fully extended position.
6) Drop in cargo deck for front frame.
7) Return frame pin release arm to the locked position.
8) Back tow vehicle closing gap in cargo decks, and engaging the frame locking pins.
9) Re-connect light cord on side of trailer.
10) Replace pins for the front cargo deck on forward end.
11) Release trailer brake on that was set on the trailer's tires.

Collapsing the Trailer
1) Set trailer brake on the trailer's tires to secure the rear frame stationary.
2) Disconnect light cord on side of trailer.
3) Remove pins for front cargo deck on forward end.
4) Pull frame pin release arm on side of trailer and secure in the unlocked position.
5) Use tow vehicle to pull front frame forward, separating the front and rear cargo decks.
6) Raise front cargo deck by a lever therefor, and secure in the raised position.
7) Back tow vehicle until both front and rear frames are completely collapsed.
8) Release lever to lower the front cargo deck flush on the rear cargo deck.
9) Return frame pin release arm to the locked position.
10) Re-connect light cord on side of trailer.
11) Replace pins for front cargo deck on forward end.
12) Back tow vehicle into the trailer thus engaging the frame locking pins.
13) Release trailer brake on that was set on the trailer's tires.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An extensible trailer, comprising:
a front frame;
a rear frame;
a slideway yoke attached fixed underneath a forward margin of the rear frame, wherein the front frame translates back and for between extremes of extended and fully collapsed states;
riding gear comprising a left and right side set of tires, wheels, brakes and a ride suspension system;
said rear frame being mounted on top of said riding gear;
said front frame has a cargo deck and supports a front wall extending between left and right edges as well as between upper and lower edges, and also supports spaced apart left and right sidewalls extending between forward and trailing edges as well as between upper and lower edges, wherein the forward edges of the front frame's left and right sidewalls meet at the front wall's left and right edges;
said front frame further comprising a roof extending between forward and trailing edges as well as between left and right edges, wherein the upper edges of the front frame's left and right sidewalls meet at the roof's left and right edges and also wherein the upper edge of the front wall meet at the roof's forward edge which altogether thus define an open-backed front compartment;
said rear frame has a cargo deck and supports spaced apart left and right sidewalls extending between forward and trailing edges as well as between upper and lower edges, wherein the forward edges of the rear frame's left and right sidewalls bracket a front opening and wherein rear edges of the rear frame's left and right sidewalls bracket a rearward access opening;
said rear frame further comprising a roof extending between forward and trailing edges as well as between left and right edges, wherein the upper edges of the rear frame's left and right sidewalls meet at the roof's left and right edges and which altogether thus define an open-fronted and open-backed rear compartment;
wherein the open-fronted and open-backed rear compartment is sized and configured for close-fitting telescopic sleeve insertion in the open-backed front compartment such that in the collapsed extreme the resultant compartment is the length of the longest of the front and rear compartments and in the extended extreme the resultant compartment is the sum of the length of the front and rear compartment;
whereby the resultant compartment of the collapsed extreme admits a relatively abbreviated cargo that only requires the size of the resultant compartment of the collapsed extreme but where also the resultant compartment of the extended extreme admits relatively larger-sized cargo that require a resultant compartment in excess of the sizes of the resultant compartment for the collapsed extreme but less than the size of the resultant compartment for the extended extreme;
said extensible trailer further comprising:
slide-out, slide-in ramps for the rear frame for loading and off-loading wheeled vehicles, and which ramps are securely carried under the rear frame of the trailer when not in use wherein the cargo deck of the front frame, the cargo deck of the rear frame and the slide-out, slide-in ramps are made of sufficiently sturdy construction to enable loading and off-loading and off-loading vehicles in either the collapsed extreme, the extended extreme, or states in between.

2. The extensible trailer according to claim 1, wherein:
the length of front compartment and the length of the rear compartment are within a few percentage points of being the same such that for the collapsed extreme the length of the resultant compartment is substantially the length of either the front or rear compartments, and, in the extended extreme the length of the resultant compartment is the sum of the length of the front and rear compartment.

3. The extensible trailer according to claim 1, wherein:
wherein the rear frame's sidewalls comprise relatively thin panels, while the front frame's sidewalls are hollow to form a slideway, wherein the slideway formed by the front frame's sidewalls are sized and proportioned such that the relatively thinner panel-form sidewalls of the rear frame can telescope therein;
whereby the sidewalls of the rear frame telescope into the sidewalls of the front frame, enabling the trailer to be collapsed and extended between the extremes of the collapsed and extended extremes.

4. The extensible trailer according to claim 1, wherein:
during use, the yoke is permanently attached to the rear frame and permanently coupled to the front frame;
said front frame further comprising a front end terminating forwardly into a tongue and then ultimately a hitch adapted for coupling to a tow vehicle that has rear riding gear, but absent from the front end is any riding gear therefor, where thus said collapsible trailer can be towed over the road in the extended extreme by virtue of the front frame being simply supported between the riding gear of the rear frame and the rear riding gear of the tow vehicle.

5. The extensible trailer according to claim 1, further comprising:
swing doors pivotally attached at the trailing ends of the sidewalls of the rear frame, wherein these swing doors entirely shut the rearward access opening whereby the rear and front frames form an enclosed van and/or camper compartment.

6. The extensible trailer according to claim 1, further comprising:
a roll door operatively attached at the trailing end of the roof of the rear frame, wherein the roll door entirely shuts the rearward access opening whereby the rear and front frames form an enclosed van and/or camper compartment.

7. The extensible trailer according to claim 1, further comprising:
elastomeric seals between the sidewalls as well as the roofs for the front and rear frames respectively whereby providing service as a moisture and/or debris barrier for the resultant combined compartment of the front and rear compartments in the extended or collapsed extreme and any degree in between.

8. The extensible trailer according to claim 7, further comprising:
elastomeric seals between the cargo decks for the front and rear frames respectively.

9. The extensible trailer according to claim 1, further comprising:
adjustability provisions for the ramps such that the ramps can be adjusted to variable width for different cargo wheel bases.

10. The extensible trailer according to claim 1, wherein:
the riding gear further comprises an independent suspension wherein each of the left- and right-side set of tires, wheels and brakes are mounted on their own independent suspension, whereby eliminating a transverse axle and providing better clearance when the trailer is towed over rough terrain.

* * * * *